March 7, 1967      W. N. THOMAS      3,307,850
MAGNETICALLY INFLUENCED QUESTION AND ANSWER GAME
Filed July 6, 1964
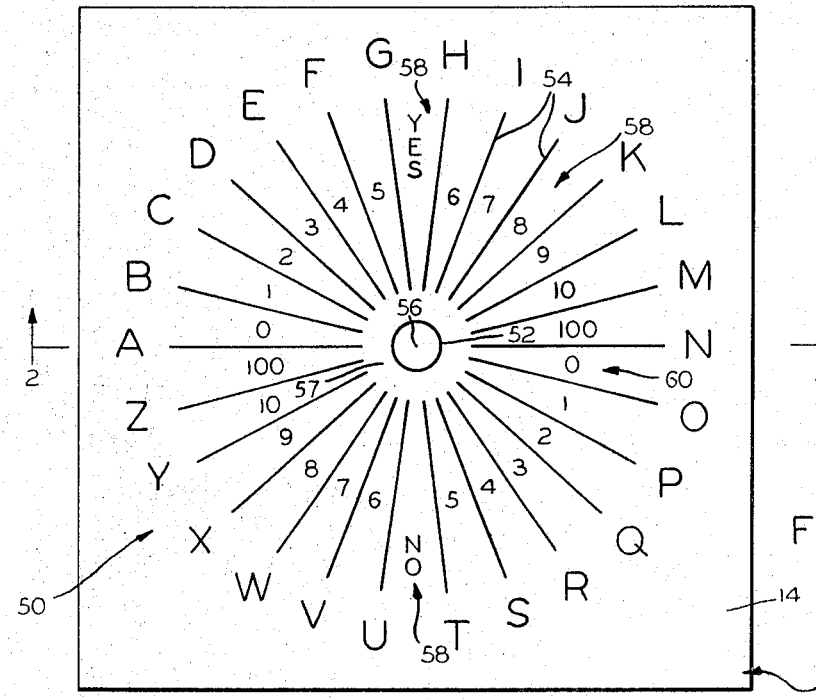
FIG. 1
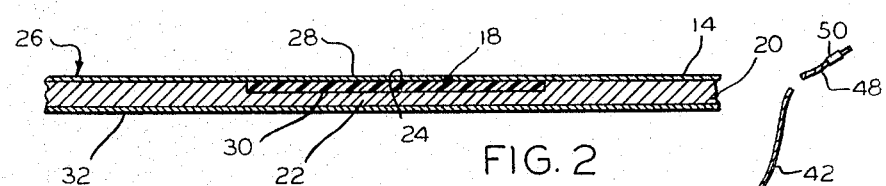
FIG. 2
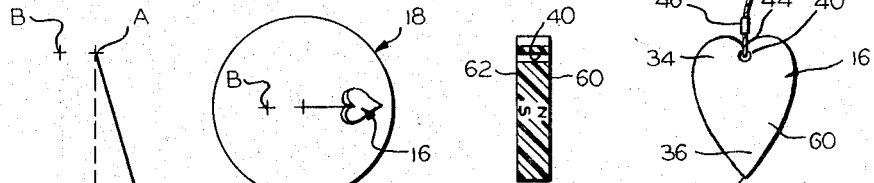
FIG. 5    FIG. 7    FIG. 6
FIG. 4    FIG. 3
INVENTOR.
WALTER N. THOMAS
BY
Mann, Brown & McWilliams
ATTORNEYS

United States Patent Office 3,307,850
Patented Mar. 7, 1967

3,307,850
MAGNETICALLY INFLUENCED QUESTION
AND ANSWER GAME
Walter Nathaniel Thomas, 8634 S. Indiana,
Chicago, Ill. 60619
Filed July 6, 1964, Ser. No. 380,252
6 Claims. (Cl. 273—161)

My invention relates to a magnetic fortune-telling game, and more particularly, to a game arrangement of the question and answer type which harnesses the operator's subconscious mind in indicating answers to the questions that are to be considered.

Heretofore there have been many types of games devised using magnetism as one of the operating features of same, and in those of the question and answer type, the questions and answers permitted are ordinarily few in number, with certain stock questions being operationally coupled in a predetermined manner with corresponding stock answers that are indicated by the position of a magnetic member. Such devices usually comprise at least one or more parts rotatably secured to a suitable base, which are to be positioned in accordance with predetermined question and answer charts in playing the game.

A principal object of my invention is to provide a magnetic fortune-telling game of the question and answer type that has no limitations as to the questions that may be asked or the answers that may be given.

Another important object of my invention is to harness the operator's subconscious mind in effecting the question and answer function of the game by providing a novel gameboard and magnet arrangement which induces the operator to answer any question asked in accordance with his subconscious response to the question.

Still other objects of the invention are to provide a magnetic question and answer type game involving only one moving part that is held by the operator, to provide a novel arrangement of magnets that serves to give the answer of questions asked, and to provide a game arrangement of the type indicated which is of the fewest possible parts, is inexpensive to manufacture and merchandise, and that is readily used by everyone.

Other objects, uses, and advantages will be obvious or become apparent from a consideration of the following detailed description and the application drawings.

In the drawings:

FIGURE 1 is a plan view of the gameboard itself, in which one of the magnet members of the game is embedded;

FIGURE 2 is a diagrammatic cross-sectional view, on an enlarged scale, substantially along line 2—2 of FIGURE 1;

FIGURE 3 is a small scale diagrammatic perspective view illustrating the manner in which the game is played;

FIGURE 4 is a diagrammatic, somewhat schematic view, substantially along line 4—4 of FIGURE 3, illustrating an important principal feature of the same;

FIGURE 5 is a plan view of the structure shown in FIGURE 4;

FIGURE 6 is a side elevational view of the pointer magnet employed as part of my game; and FIGURE 7 is a diagrammatic cross-sectional view through the pointer magnet, taken substantially along line 7—7 of FIGURE 6.

However, it is to be understood that the drawing illustrations provided are supplied primarily to comply with the requirements of 35 U.S.C. 112, and that the game may have other specific embodiments.

Reference numeral 10 of FIGURE 3 generally indicates my game as a whole, which comprises a gameboard 12 provided with a substantially planar gameboard surface 14 with which is associated a heart-shaped pointer magnet 16 that magnetically cooperates with a circular disc magnet 18 (see FIGURE 2) which is embedded in gameboard 12 under surface 14.

The gameboard 12 in the form illustrated comprises a sheet 20 of paperboard or the like that is formed adjacent its midportion 22 with a central recess 24 in which the magnet 18 is seated. Covering the magnet 18 is a sheet 26 of paper or the like on which is imprinted the indicia indicated in FIGURE 1 that defines the gameboard playing indicia of the game.

The circular disc magnet 18 may be made from any suitable substance, but in accordance with this game, it is magnetized or polarized so that its faces 28 and 30 have opposite polarity, such as the polarity indicated in FIGURE 4 in which the magnet 18 is indicated in blocked diagram form. Magnet 18 is of the so-called permanent magnet type and is preferably made from barium ferrite, and while the ceramic or sintered product will be satisfactory, I prefer to have the magnet 18 made from a rubber bonded barium ferrite material made by Leyman Corporation, Magnetics Division, of Cincinnati, Ohio, under the trademark Plastiform, which provides a machinable product that can readily be shaped to the desired form by using ordinary cutting tools or instrumentalities.

As indicated, the magnet 18 should be flat and circular in configuration, and preferably has a minimum thickness to avoid undue bulk in the gameboard. A thickness on the order of $\frac{1}{32}$ of an inch has been found to be a very practical working dimension for the disc magnet 18.

However, disc magnets made from the usual steel or iron material, when magnetized in the manner indicated, will be satisfactory.

The undersurface of paperboard 20 is covered by a suitable paper sheet 32 or the like, which may bear suitable advertising or illustrative materials, directions, or the like.

Magnet 16 is preferably of the same type as magnet 18, and is preferably flat or disc-like in planar configuration, and is made from the same material specified above and magnetized in a similar manner, as indicated in FIGURES 4 and 7. Preferably, magnet 18 has a somewhat greater thickness for rigidity purposes and a trickness dimension on the order of $\frac{1}{8}$ of an inch is preferred.

Magnet 16 is, in accordance with the principles of the game disclosed herein, formed in the shape of a heart having an upper or head portion 34 and a lower or tip portion 36 terminating in a pointed tip 38. The head portion 34 of magnet 16 is formed with an opening 40 to provide for attachment of a length of string or cord 42. Thus, the parallel portion of the string 42 adjacent its end 44 is passed through the opening 40 and then brought around and secured to the string in any suitable manner, as by a knot or a suitable fastener device 46. The other end 48 of the string is knotted or provided with a suitable clamp 50 (though a knot will suffice) to prevent unravelling.

The indicia of the gameboard surface 12 is indicated by reference numeral 50 of FIGURE 1 and comprises a centrally located circle 52 that is disposed in concentric relation with circular disc magnet 18 and immediately above same. Twenty-six radial lines 54 are provided about the axis 56 of circle 52, and as indicated, each of the lines 54 points to a separate letter of the alphabet. The lines 54 define spaces 58 in which numbers 60 in consecutive relation are applied, from zero through ten except for four oppositely positioned spaces 58. In two of the oppositely disposed spaces 58 the words "yes" and "no" are respectively imprinted, while in the other two spaces 58 the number "100" is imprinted in each.

The specific gameboard indicia 50 illustrated is arranged to take advantage of the natural reaction and eye travel of the operator.

Thus, the letters of the alphabet are arranged in a symmetrical manner about the outer periphery of the gameboard and read in their normal clockwise sequence and manner (starting with "A" at the left and reading from left to right over the top edge of the board and then about the bottom edge of the board). Also the numbers from 0 to 100 read in the same manner about the board.

The letters most often used (A–N) appear at the upper portion of the board and read in the normal left to right sequence. The symmetrical arrangement defined by the letters permits the "yes" answer to be at the top of the board and the "no" answer to be at the diametrically opposed bottom portion of the board.

The lines 54, which are preferably red in color against a white background, converge on the circle 52, which preferably is colored red across its diameter.

This arrangement of letters and numbers, I have found, consistently answers correctly a substantial number of different types of questions that might be put to the board by any one operator.

In use, the gameboard 12 is placed on a flat horizontally disposed surface with the gameboard surface 14 facing upwardly. The operator grasps the string or cord 42 at its end 48 and moves the upper end of the string to a point A that is vertically above and in alignment with the axis 56 of circle 52, which is coincident with the central axis of circular disc magnet 18. This would position the pointer magnet 16 directly above the disc magnet 18 if sufficient space is maintained between the two, but as magnet 16 is lowered into close proximity to the gameboard 12, the magnetic forces acting between the magnets 16 and 18 will dispose the lower end 36 of pointer magnet 16 adjacent to the periphery of magnet 18. As magnet 18 has a diameter that is substantially equivalent to the diameter of the imaginary circle that connects the inner ends of all of the radial lines 54, this will dispose the pointed end 38 of the pointer magnet 16 in the clear annular space 57 that appears between the circle 52 and the inner ends of the lines 54, and as the pointed end is brought into contact with the board it will be in substantial circumambient alignment with the inner ends of lines 54.

So long as the upper end of the string or cord 42 is maintained in alignment with axis 56, the magnet will be free to move about the periphery of magnet 18 and meets only insignificant resistance to its movement because of the substantially frictionless system of which it forms a part. However, if the string or cord 42 moves to one side of the axis 56, as to the position B, the magnet will move about the periphery of the magnet 18 to the side of magnet 18 that is closest to the position B and come to a position of substantial rest. In doing this, the pointer magnet 16 seeks the position that results in the shortest lines of magnetic force between the two magnets, and this position will be the shortest element of the imaginary cone formed by the point B and the periphery of circular disc magnet 18.

In using the game 10 to answer questions, the operator grasping the end 48 of string or cord 42 holds the heart-shaped pointer magnet 16 about six inches above the center circle 52 and speaking aloud asks a question that either has been presented to him or involves a subject for which the operator desires an answer. The operator then slowly lowers the pointer magnet 16 toward the circle 52, while maintaining the upper portion of the string or cord 48 in substantial alignment with axis 56. As the pointer magnet nears the proximity of circle 52 and thus magnet 18, magnet 16 will commence to revolve about circle 52, which focuses the operator's attention on the board and magnet 16.

Applicant has found that subconsciously the operator will, through his subconscious mind, cause a slight movement of his hand in the direction of the letters and/or numbers that form the answer to his subconscious thoughts or his reaction to the question, and while this movement may be so slight as to not be perceptible, the magnetic forces involved will move the pointer magnet to the answer dictated by the operator's subconscious thoughts. As the operator's attention is concentrated on the board by the revolving magnet 16, he is not aware of these slight hand movements, however.

If the nature of the answer requires a yes or no answer, it will be found that the pointer magnet 16 will indicate the yes or no answer. It does this through the operator's subconscious mind causing him to position the upper end of the string 48 somewhat off the axis 56 in the direction of the correct answer; if this is "yes," this direction will be in the direction of the "yes" space 58, and the magnetic forces involved will position the indicator magnet 15 at the "yes" space.

If the answer is a number, the pointer magnet will move to the number for the same reason.

If the answer is to be spelled out, or the number involved has more digits than are in any of the spaces 58, the individual numbers or letters will be pointed to consecutively.

Where the operator maintains the upper end of cord or string 48 in substantial alignment with the axis 56, the pointer magnet will not settle on any one space and will continue to move about the circle 52 due to the slight motion that everyone's hand has when holding something suspended.

It will thus be seen that my magnetic question and answer game involves a new relation between a pair of disc magnets in which the magnetization is through the thickness of both of the magnet elements employed.

Thus, with regard to the pointer magnet 16, this magnet is magnetized so that its opposite faces 60 and 62 have opposite polarity, while in the case of the circular disc magnet 18, it is magnetized so that its opposite faces 28 and 30 have opposite polarity. The pointer magnet 16 is disposed by the operator to position its faces 60 and 62 substantially crosswise the planes of faces 28 and 30 of disc magnet 18, and the result is that regardless of which face 60 or 62 happens to be disposed adjacent the disc magnet 18, the pointer magnet 16 will turn, if necessary to present always the same face toward the axis 56 when pointer magnet 16 is in magnetic relation with magnet 18.

Pointer magnet 16 thus comprises a suspended pendulum member with magnetic characteristics arranged to automatically dispose magnet 16 in operative relation with magnet 18 without any special positioning by the operator being required other than disposing magnet 16 above and in substantial alignment with axis 56 and lowering it close to the proximity of the gameboard surface 14.

My magnet arrangement has been found to harness the subconscious mind of the operator to provide the answers to questions that may be asked in playing the game. The subconscious mind of the operator causes him to in effect preposition the pointer magnet in the position dictated by his subconscious mind, but, of course, there is no predetermined pattern for this as each individual will necessarily have different subconscious thoughts about any particular question.

It will be appreciated that my game involves only one moving part which requires no special connection or association with the gameboard other than the positioning above described.

The limited number of parts involved make for ready and inexpensive manufacture and the magnetic principles that are involved could provide attractive entertainment for the young and old alike.

The foregoing description and the drawings are given merely to explain and illustrate my invention and the invention is not to be limited thereto, except insofar as the appended claims are so limited, since those skilled in

I claim:
1. A magnetic question and answer game comprising:
 a gameboard,
 a disc magnet carried by the gameboard and disposed in a plane that parallels said gameboard,
 said disc magnet being magnetized to provide its faces with opposite polarity,
 answer indicating indicia formed on said gameboard about the axis of said disc magnet as a center,
 and a pointer magnet adapted to be suspended over said disc magnet,
 said pointer magnet comprising:
 a strip of magnetic material defining oppositely facing side surfaces,
 said strip being magnetized to provide its said faces with opposite polarity,
 and means for suspending said pointer magnet over and in substantial alignment with said disc magnet with said pointer magnet faces disposed crosswise of said disc magnet faces.

2. The game set forth in claim 1 wherein:
 said pointer magnet is heart shaped,
 with said pointer magnet being suspended from the head end thereof.

3. A magnetic question and answer game comprising:
 a planar gameboard,
 a disc magnet defining oppositely facing side faces embedded in said gameboard adjacent the mid-portion of said gameboard,
 said disc magnet being in coplanar relation with said gameboard,
 said disc magnet being magnetized to provide its said faces with opposite polarity,
 answer indica formed on said gameboard about the axis of said disc magnet as a center,
 and a pointer magnet adapted to be suspended over said disc magnet,
 said pointer magnet comprising,
 a pendulum member defining oppositely facing side surfaces,
 said pendulum member being magnetized to provide its said surfaces with opposite polarity,
 and means for suspended said pendulum member over and in substantial alignment with said disc magnet and with said pendulum member side surfaces disposed crosswise of said disc magnet faces.

4. The game set forth in claim 3 wherein:
 said pendulum member is a heart shaped disc member in which said side surfaces of said pendulum member are defined by the side surfaces of said disc member,
 said pendulum member being supported from the head end thereof.

5. A magnetic question and answer game comprising:
 a planar gameboard having a planar circular disc magnet secured thereto in parallel relation therewith,
 said disc magnet being magnetized to provide its opposite faces with opposite polarity,
 answer indicating indicia formed on said gameboard about said magnet,
 and a heart-shaped disc magnet adapted to be suspended over said board disc magnet,
 said heart shaped disc magnet being magnetized to provide its opposite faces with opposite polarity,
 and a string member having one end secured to the head end of said heart shaped disc,
 whereby said heart shaped disc may be held over said board circular disc magnet by grasping the other end of said string member, and when said heart shaped disc magnet is lowered to the proximity of said circular disc magnet with said string one end in substantial vertical alignment with the axis of said circular magnet, said heart shaped magnet will tend to move about the periphery of said circular magnet.

6. The game set forth in claim 5 wherein:
 said gameboard defines game playing indicia, said indicia comprising:
 a circular configuration in concentric relation to said disc magnet,
 twenty-six equally spaced radial lines of equal length extending outwardly from the axis of said circle as a center,
 said lines being positioned to define a space between two adjacent lines at the top of the board and a diametrically opposed space between two other adjacent lines at the bottom of the board,
 the word "yes" imprinted in the first mentioned space,
 the word "no" imprinted in the second mentioned space,
 a letter of the alphabet disposed adjacent the outer end of each line,
 with said letters being arranged in alphabetical order commencing at the left hand side of the board and reading clockwise about the board,
 a number disposed in each of the spaces between said radial lines except said first and second mentioned spaces,
 said numbers commencing with 0 at the left hand side of the board and reading consecutively up to 10 clockwise about the board,
 with the next space after 10 having the number 100 applied thereto and subsequent numbers clockwise about said board repeating said numbers,

References Cited by the Examiner
UNITED STATES PATENTS

| | | | |
|---|---|---|---|
| 1,481,256 | 1/1924 | Dols | 46—238 |
| 1,514,260 | 11/1924 | Rees | 273—161 |
| 2,220,049 | 10/1940 | Dunmore | 46—239 |
| 3,118,669 | 1/1964 | Merrill | 46—242 X |
| 3,249,357 | 5/1966 | Luchsinger | 273—1 |

RICHARD C. PINKHAM, *Primary Examiner.*

ANTON O. OECHSLE, *Examiner.*